UNITED STATES PATENT OFFICE.

JOHANNES WALTER, OF BASLE, SWITZERLAND, ASSIGNOR TO JOHN R. GEIGY & CO., OF SAME PLACE.

PROCESS OF MAKING A YELLOW DYE.

SPECIFICATION forming part of Letters Patent No. 398,990, dated March 5, 1889.

Application filed December 18, 1888. Serial No. 293,995. (Specimens.)

*To all whom it may concern:*

Be it known that I, Dr. JOHANNES WALTER, of Basle, Switzerland, have invented a certain new and useful Process for the Production of a Yellow Coloring-Matter, of which the following is a specification.

My invention relates to the manufacture of a yellow dye-stuff by the action of salicylic acid on diazothioparatoluidine sulphonic acid.
To carry out the invention, I dissolve, for instance, fifty kilos of the sodium salt of thioparatoluidine sulphonic acid in water and mix it with fifteen kilos of sulphuric acid. To the precipitate of the acid compound so obtained and cooled with ice six kilos of nitrite of sodium dissolved in water are gradually added. The solution of the diazo compound is poured into an alkaline solution of twelve kilos of salicylic acid containing enough caustic soda to saturate the whole quantity of acids employed. Two hours later the mixture is boiled, and then the color precipitated with common salt. It can be used for dyeing and printing cotton, and has the great advantage of standing both light and chlorine.

Having thus described my invention, what I claim as new, and desire to secure by Letters Patent, is—

The herein-described process for producing a new yellow coloring-matter by first dissolving sodium salt of thioparatoluidine sulphonic acid in water, mixing it with sulphuric acid, and to the precipitate of the acid compound thus obtained and cooled with ice adding gradually nitrite of sodium dissolved in water, the solution of the diazo compound poured into an alkaline solution of salicylic acid containing enough caustic soda to saturate the acids employed, the mixture being then boiled, and after that the color precipitated with salt, substantially as described.

In testimony whereof I hereunto sign my name, in the presence of two subscribing witnesses, this 7th day of December, 1888.

JOHANNES WALTER.

Witnesses:
GEORGE GIFFORD,
CHS. A. RICHTER.